United States Patent
Liu et al.

(10) Patent No.: US 10,985,890 B2
(45) Date of Patent: Apr. 20, 2021

(54) METHOD OF LINKING EXTENDED PUCCH RESOURCES FOR ACK/NACK IMPLICITLY TO ECCES USED BY EPDCCH

(71) Applicant: Alcatel Lucent, Boulogne Billancourt (FR)

(72) Inventors: Zheng Liu, Shanghai (CN); Qi Jiang, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 431 days.

(21) Appl. No.: 14/385,973

(22) PCT Filed: Mar. 4, 2013

(86) PCT No.: PCT/IB2013/000540
§ 371 (c)(1),
(2) Date: Sep. 17, 2014

(87) PCT Pub. No.: WO2013/140237
PCT Pub. Date: Sep. 26, 2013

(65) Prior Publication Data
US 2015/0110022 A1    Apr. 23, 2015

(30) Foreign Application Priority Data

Mar. 19, 2012 (CN) .................. 201210073146.X

(51) Int. Cl.
*H04L 5/00* (2006.01)
*H04W 72/04* (2009.01)
*H04L 1/18* (2006.01)

(52) U.S. Cl.
CPC .......... *H04L 5/0055* (2013.01); *H04L 1/1861* (2013.01); *H04L 1/1887* (2013.01); *H04W 72/042* (2013.01); *H04W 72/0413* (2013.01)

(58) Field of Classification Search
CPC ............ H04L 5/0055; H04W 72/0413; H04W 72/042
See application file for complete search history.

(56) References Cited

U.S. PATENT DOCUMENTS

| | | |
|---|---|---|
| 2008/0273513 A1 | 11/2008 | Montojo et al. |
| 2011/0116455 A1 | 5/2011 | Damnjanovic et al. |

(Continued)

FOREIGN PATENT DOCUMENTS

| | | |
|---|---|---|
| CN | 101115271 | 1/2008 |
| WO | WO 2011/136523 | 11/2011 |

OTHER PUBLICATIONS

Alcatel-Lucent Shanghai Bell et al., "PUCCH resource mapping with ePDCCH," 3$^{rd}$ Generation Partnership Project (3GPP), 3GPP TSG RAN WG1 Meeting #67, R1-114066, 2 pages, XP050562401, San Francisco, USA, Nov. 14-18, 2011.

(Continued)

*Primary Examiner* — Shailendra Kumar
(74) *Attorney, Agent, or Firm* — Fay Sharpe LLP

(57) ABSTRACT

The invention proposes a method of linking extended PUCCH resources for ACK/NACK implicitly to eCCEs used by EPDCCH. According to an embodiment of the invention, extended PUCCH resources for ACK/NACK are indexed based on the numbering of eCCEs. As compared with a method of indexing extended PUCCH resources for ACK/NACK through explicit linking, this method of implicit linking can save a significant signaling overhead and facilitate a standardization course. Furthermore this method further addresses the problem in the prior art of the lack of a linkage between extended PUCCH resources for ACK/NACK implicitly to eCCEs used by EPDCCH.

15 Claims, 3 Drawing Sheets

(56) References Cited

U.S. PATENT DOCUMENTS

| | | | |
|---|---|---|---|
| 2011/0317653 A1 | 12/2011 | Kwon et al. | |
| 2013/0064216 A1* | 3/2013 | Gao | H04L 5/0016 370/330 |
| 2013/0242890 A1* | 9/2013 | He | H04L 5/1469 370/329 |
| 2014/0301329 A1* | 10/2014 | Kim | H04L 1/1861 370/329 |

OTHER PUBLICATIONS

International Search Report for PCT/IB2013/000540 dated Jun. 12, 2013.
Samsung, "HARQ-ACK Transmission in Response to E-PDCCH Detection", R1-120193, 3GPP TSG RAN WG1 #68, Dresden, Germany, Feb. 6-10, 2012, pp. 1-3.
Asustek, "PUCCH Resource Allocation Corresponding to ePDCCH" R1-120666, 3GPP TSG RAN WG1 Meeting #68, Dresden, German, Feb. 6-10, 2012.

\* cited by examiner current PUCCH resource mapping    extended PUCCH resource mapping

METHOD OF LINKING EXTENDED PUCCH RESOURCES FOR ACK/NACK IMPLICITLY TO ECCES USED BY EPDCCH

FIELD OF THE INVENTION

The present disclosure relates to a physical uplink control channel and more particularly to a method of linking extended PUCCH resources for ACK/NACK implicitly to eCCEs used by EPDCCH.

BACKGROUND OF THE INVENTION

At present, an enhanced Physical Downlink Control Channel (EPDCCH) has been introduced during the course of standardizing the 3GPP LTE-A and will be increasingly widely applied. The EPDCCH is located in the data domain and demodulated based on a Demodulation-Reference Signal (DM-RS) transmitted in a physical resource block allocated for transmission of downlink control information. The introduction of the EPDCCH in combination with an original PDCCH can enable more user equipments to be scheduled in a given frame, and this requires more PUCCH resources for feedback of a Hybrid-ARQ Acknowledgement/Not Acknowledgement (HARQ ACK/NACK).

To this end, extended PUCCH resources have been proposed and introduced in the document "PUCCH resource mapping with EPDCCH" by Alcatel-Lucent Shanghai Bell to accommodate a significant ACK/NACK demand arising from EPDCCH scheduling. As illustrated in FIG. 1, the left and right segments of the figure schematically illustrate PUCCH resource mapping before and after the extension respectively. However, how to link the extended PUCCH resources to respective resources occupied by the EPDCCH has not been solved yet.

On the other hand, in the Rel-10, a corresponding PUCCH resource for ACK/NACK is linked by numbering of a legacy PDCCH Control Channel Element (CCE). However, the foregoing linking scheme is inapplicable to the EPDCCH which is structurally different from the PDCCH. Furthermore, although there is an ongoing discussion in the 3GPP RAN 1 about an enhanced Control Channel Element (eCCE), for details of which, reference can be made to the document "Multiplexing of different DCI messages on EPDCCH" by Alcatel-Lucent, Alcatel-Lucent Shanghai Bell, there has been no discussion about how to number the eCCE.

Thus, in the case of EPDCCH, there is an urgent issue of how to link extended PUCCH resources for ACK/NACK implicitly to eCCEs used by the EPDCCH.

SUMMARY OF THE INVENTION

Apparently the scheme to link the corresponding PUCCH resources for the ACK/NACK by the numbering of the legacy PDCCH CCEs as mentioned in the background of the invention is inapplicable in the case of EPDCCH, and no corresponding solution has been proposed in the prior art.

In view of this, the invention proposes to index extended PUCCH resources for ACK/NACK baesd on the numbering of eCCEs to thereby determine the correct extended PUCCH resource for the ACK/NACK.

According to a first aspect of the invention, there is proposed a method, in a base station of a communication system, of linking extended PUCCH resources for ACK/NACK implicitly to eCCEs used by EPDCCH, wherein the base station serves user equipments, the EPDCCH uses the eCCEs for transmission, and the method includes the steps of: a. numbering the plurality of extended PUCCH resources for the ACK/NACK, wherein each of the plurality of extended PUCCH resources corresponds to one user equipment; b. numbering the eCCEs used by all the EPDCCHs; c. determining a linkage between the numbering of the extended PUCCH resources and the numbering of the eCCEs; d. sharing with the user equipment the linkage and information associated with the numbering of the extended PUCCH resources; and e. transmitting number information associated with the eCCEs to the user equipment.

Particularly, the eCCEs are numbered for the user equipments, that is, the eCCEs corresponding to a user equipment can be determined based on the user equipment. Furthermore, the information associated with the numbering of the extended PUCCH resources can include, for example, a correspondence between the extended PUCCH resources and the numbering of the extended PUCCH resources.

According to an embodiment of the invention, the step c further includes: determining the linkage between the numbering of the extended PUCCH resources and the numbering of the eCCEs according to a boundary index. The boundary index can reflect, for example, an offset between legacy PUCCH resources and the extended PUCCH resources, for details of which, reference can be made to the document "PUCCH resource mapping with EPDCCH" by Alcatel-Lucent Shanghai Bell.

According to an embodiment of the invention, the step e further includes: the number information includes an offset factor when the eCCEs of the EPDCCH resources are numbered subsequent to numbering of CCEs of legacy PDCCH resources. The offset factor can indicate the offset extent, which the numbering of the eCCEs of the EPDCCH has relative to the numbering of the CCEs of the legacy PDCCH, and thus the user equipment can locate the numbering of the eCCEs corresponding to the offset factor upon reception of the offset factor.

According to an embodiment of the invention, the step e further includes: the number information includes the numbering of the eCCEs when the eCCEs of the EPDCCH resources are numbered separately.

According to an embodiment of the invention, the method further includes the step f of: according to numbering of eCCEs corresponding to a receiving user equipment and based upon the linkage, determining extended PUCCH resource for the ACK/NACK for the user equipment, and receiving the ACK/NACK from the user equipment over the determined resource. Specifically, the base station can identify which user equipment has transmitted the ACK/NACK and thus can determine the numbering of the eCCEs corresponding to the user equipment, for example, the numbering of the eCCEs can be the lowest numbering of the eCCEs corresponding to the user equipment. Next, the base station determines the numbering of the extended PUCCH resource for the ACK/NACK for the user equipment using the linkage and thus receives the ACK/NACK from the user equipment over the extended PUCCH resource corresponding to the numbering.

According to a second aspect of the invention, there is proposed a method, in a user equipment of a communication system, of linking extended PUCCH resources for ACK/NACK implicitly to eCCEs used by EPDCCH, wherein the user equipment is served by a base station, the EPDCCH uses the eCCEs for transmission, and the method includes the steps of: A. sharing, with the base station, information associated with numbering of the extended PUCCH resources and a linkage between the numbering of the extended PUCCH resources and numbering of the eCCEs; B. receiving number information associated with the eCCEs from the base station; and C. determining the numbering of the extended PUCCH resource for the ACK/NACK based upon the number information and the linkage.

According to an embodiment of the invention, the linkage is a linkage between the numbering of the extended PUCCH resource and the numbering of the eCCE according to a boundary index.

According to an embodiment of the invention, the number information includes an offset factor when the eCCEs of the EPDCCH resources are numbered subsequent to numbering of CCEs of legacy PDCCH resources.

According to an embodiment of the invention, the number information includes the numbering of the eCCEs when the eCCEs of the EPDCCH resources are numbered separately.

According to an embodiment of the invention, the method further includes the step D of: transmitting the ACK/NACK to the base station over the extended PUCCH resource corresponding to the determined numbering of the extended PUCCH resources for the ACK/NACK, according to the information associated with the numbering of the extended PUCCH resources. Specifically, the user equipment can index the extended PUCCH resource corresponding to itself according to the information associated with the numbering of the extended PUCCH resources and transmit the ACK/NACK to the base station over the indexed resource.

According to a third aspect of the invention, there is proposed a method, in a base station of a communication system, of linking extended PUCCH resources for ACK/NACK implicitly to eCCEs used by EPDCCH, wherein the base station serves user equipments, the EPDCCH uses the eCCEs for transmission, and the method includes the steps of: G1. numbering the plurality of extended PUCCH resources for ACK/NACK, wherein each of the plurality of extended PUCCH resources corresponds to one user equipment; G2. determining a linkage between the numbering of the extended PUCCH resources and numbering of the eCCEs according to a predetermined parameter; and G3. sharing with the user equipment the linkage and information associated with the numbering of the extended PUCCH resources.

According to an embodiment of the invention, the method further includes the step of: G4. according to numbering of eCCEs corresponding to a receiving user equipment and based upon the linkage, determining extended PUCCH resource for the ACK/NACK for the user equipment, and receiving the ACK/NACK from the user equipment over the determined resource.

According to an embodiment of the invention, the predetermined parameter includes a sequence number of a physical resource block pair occupied by the user equipment, the total number of eCCEs in the physical resource block pair, DM-RS configuration information and a boundary index. Specifically, in order to avoid conflicting numbering of extended PUCCHs determined by respective user equipments, the linkage between the numbering of the extended PUCCH resources and the numbering of the eCCEs can be determined from the foregoing parameters, e.g., the sequence number of the physical resource block pair including the eCCE with the lowest numbering of the EPDCCH corresponding to the user equipment, the total number of DM-RS configurations applied on the eCCE, the sequence number of the DM-RS configuration of the user equipment, etc. Those skilled in the art can appreciate that specific configurations of the foregoing respective predetermined parameters can be adjusted, for example, according to the number of user equipments.

According to a fourth aspect of the invention, there is proposed a method, in a user equipment of a communication system, of linking extended PUCCH resources for ACK/NACK implicitly to eCCEs used by EPDCCH, wherein the user equipment is served by a base station, the EPDCCH uses the eCCEs for transmission, and the method includes the steps of: i. sharing, with the base station, information associated with numbering of the extended PUCCH resources and a linkage between the numbering of the extended PUCCH resources and numbering of the eCCEs, wherein the linkage is determined according to a predetermined parameter; ii. numbering eCCEs in a physical resource block pair allocated to the user equipment; and iii. determining the numbering of the extended PUCCH resource for the ACK/NACK based upon the numbering of the eCCEs and the linkage.

According to an embodiment of the invention, the method further includes the step of: iv. transmitting the ACK/NACK to the base station over the extended PUCCH resource corresponding to the determined numbering of the extended PUCCH resources for the ACK/NACK, according to the information associated with the numbering of the extended PUCCH resources.

According to an embodiment of the invention, the predetermined parameter includes a sequence number of a physical resource block pair occupied by the user equipment, the total number of eCCEs in the physical resource block pair, DM-RS configuration information and a boundary index.

With the preferred technical solutions of the invention, the eCCEs can be numbered either globally at the base station side or locally at the user equipment side, and in the case that the eCCEs are numbered locally at the user equipment side, an additional signaling overhead arising from transmission of the number information associated with the eCCEs to the user equipments can further be saved. Furthermore with the preferred implementations of the invention, the implicit linkage is created between the extended PUCCH resources for the ACK/NACK and the eCCEs used by the EPDCCH so that the respective user equipments can transmit the ACK/NACK over the extended PUCCH resource corresponding to downlink scheduling data scheduled by the EPDCCH. On the other hand, a signaling overhead can further be saved relative to an explicit linkage to thereby facilitate a standardization course.

BRIEF DESCRIPTION OF DRAWINGS

Other features, objects and advantages of the invention will become more apparent upon review of the following detailed description of non-limiting embodiments taken with reference to the drawings in which.

DETAILED DESCRIPTION OF EMBODIMENTS

Figure 1:
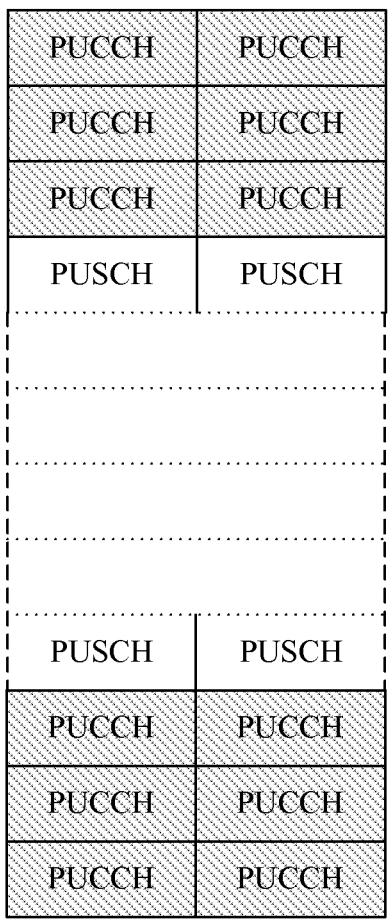
FIG. 1 illustrates a schematic of PUCCH resource mapping before and after the extension.
Figure 1:
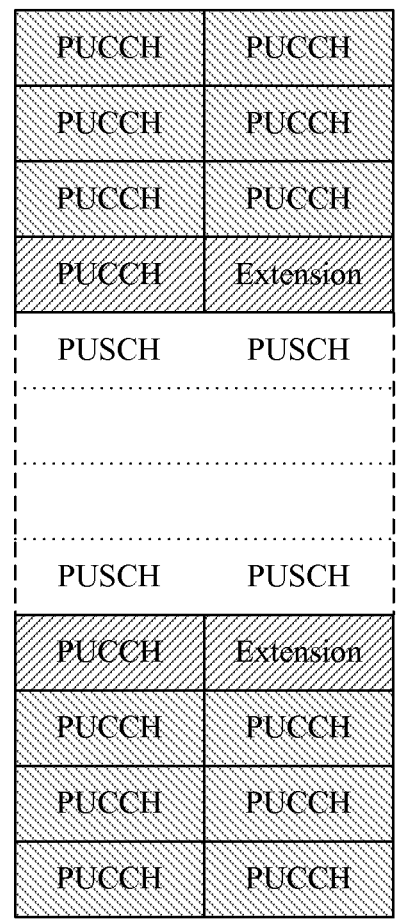
Figure 2:
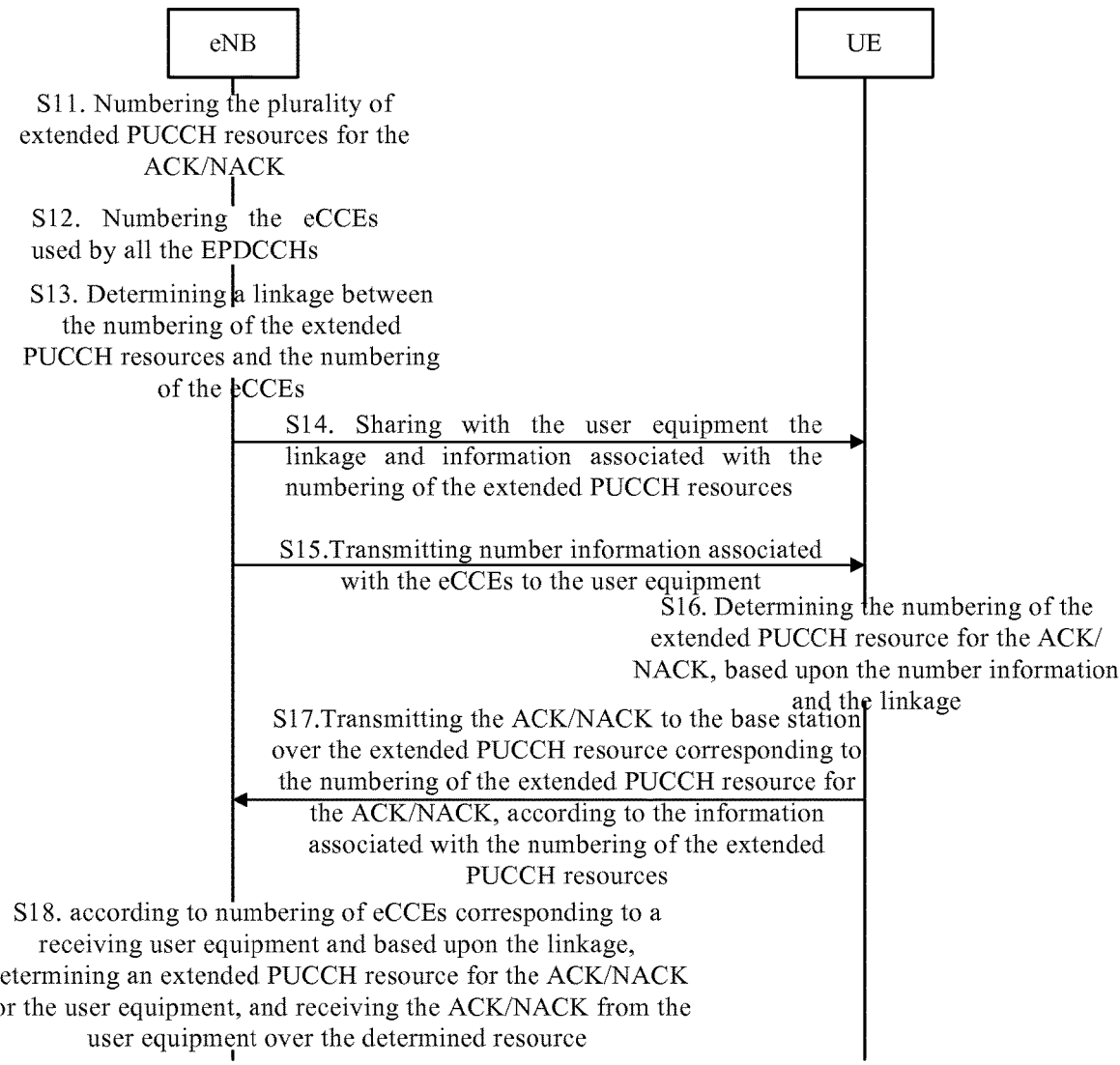
FIG. 2 illustrates a flow chart of a system method of linking extended PUCCH resources for ACK/NACK implicitly to eCCEs used by EPDCCH according to an embodiment of the invention.

FIG. 2 illustrates a flow chart of a system method of linking extended PUCCH resources for ACK/NACK implicitly to eCCEs used by EPDCCH according to an embodiment of the invention. In this embodiment, the extended PUCCH resources for the ACK/NACK are indexed by numbering the eCCEs used by all the EPDCCHs, that is, by numbering the eCCEs globally at the base station side.

As illustrated, in the step S11, the base station numbers the plurality of extended PUCCH resources for the ACK/NACK, where each of the plurality of extended PUCCH resources corresponds to one user equipment.

In the step S12, the base station numbers the eCCEs used by all the EPDCCHs, that is, the base station numbers the eCCEs globally. This numbering process is performed for the user equipments, that is, the numbering of the eCCEs occupied by the user equipments and the corresponding eCCEs can be determined via a user equipment.

In the step S13, the base station determines a linkage between the numbering of the extended PUCCH resources and the numbering of the eCCEs. Preferably, the linkage between the numbering of the extended PUCCH resources and the numbering of the eCCEs can be determined according to a boundary index.

$$n_{aPUCCH}^{(1)} = n_{global\_eCCE} + N_{aPUCCH}^{(1)} \quad \text{Eq. 1}$$

In the equation, $n_{aPUCCH}^{(1)}$ represents the numbering of the extended PUCCH resources, $n_{global\_eCCE}$ represents the lowest numbering of the eCCEs occupied by the EPDCCH, for corresponding downlink scheduling data, corresponding to the user equipment, that is, the numbering of the first eCCE occupied by the user equipment, in the case that the eCCEs are numbered globally, and $N_{aPUCCH}^{(1)}$ represents the boundary index for the extended PUCCH resources and, for example, can be set at a higher layer to reflect an offset between legacy PUCCH resources and the extended PUCCH resources, for details of which, reference can be made to the document "PUCCH resource mapping with EPDCCH" by Alcatel-Lucent Shanghai Bell.

Those skilled in the art can appreciate that Equation 1 is merely one implementation to represent the linkage between the numbering of the extended PUCCH resources and the numbering of the eCCEs. In another embodiment, a similar linkage can be derived in the case that the respective parameters in Equation 1 are modified accordingly, for example, $n_{global\_eCCE}$ can represent the numbering of the last eCCE occupied by the user equipment instead of the numbering of the first eCCE occupied by the user equipment.

In the step S14, the base station shares with the user equipment the linkage and information associated with the numbering of the extended PUCCH resources. Preferably, this process can be performed, for example, as per predefinition to thereby avoid the need for the base station to transmit additional signaling to the user equipment for performing the foregoing process. Furthermore the information associated with the numbering of the extended PUCCH resources can include, for example, a correspondence between the extended PUCCH resources and the numbering of the extended PUCCH resources.

In the step S15, the base station transmits number information associated with the eCCEs to the user equipment. The number information can include, for example, information associated with the numbering of the eCCEs of the EPDCCH resources, for example, whether the eCCEs of the EPDCCH resources are numbered subsequent to numbering of CCEs of legacy PDCCH resources or the eCCEs of the EPDCCH resources are numbered separately.

Alternatively, the base station and the user equipment can predefine the information associated with the numbering of the eCCEs of the EPDCCH resources, that is, for example, whether the eCCEs of the EPDCCH resources are numbered subsequent to numbering of CCEs of legacy PDCCH resources or the eCCEs of the EPDCCH resources are numbered separately. Thus, in this case, the number information may not include any information associated with the numbering of the eCCEs of the EPDCCH resources.

The number information includes an offset factor when the eCCEs of the EPDCCH resources are numbered subsequent to the numbering of the CCEs of the legacy PDCCH resources. The offset factor can indicate the offset extent, which the numbering of the eCCEs of the EPDCCH has relative to the numbering of the CCEs of the legacy PDCCH, and thus the user equipment can locate the numbering of the eCCEs corresponding to the offset factor, i.e., $n_{global\_eCCE}$ in Equation, by the offset factor upon reception of the offset factor.

Alternatively, the number information includes the numbering of the eCCEs, i.e., $n_{global\_eCCE}$ in Equation, when the eCCEs of the EPDCCH resources are numbered separately.

Preferably, the step S15 can be performed by the base station using user-specific higher-layer signaling (e.g., RRC signaling).

Alternatively, if the EPDCCH resources can be accessed by all the user equipments, for example, when distributed EPDCCH mapping is performed by EPDCCH, then the step S15 may not be performed. On the other hand, if the EPDCCH resources can not be accessed by all the user equipments, for example, when localized EPDCCH mapping or group-specific distributed EPDCCH mapping is performed by EPDCCH, then the step S15 will be performed.

Next in the step S16, the user equipment determines the numbering of the extended PUCCH resource for the ACK/NACK corresponding to itself based upon the number information and the linkage (e.g., Equation 1)

For example, in the case that the eCCEs of the EPDCCH resources are numbered subsequent to the numbering of the CCEs of the legacy PDCCH resources, the user equipment can derive the numbering of the eCCEs (for example, the numbering of the first eCCE occupied by the user equipment) using the received offset factor, and thus determine the numbering $N_{aPUCCH}^{(1)}$ of the extended PUCCH resource for the ACK/NACK corresponding to the user equipment, by using Equation 1.

In another example, in the case that the eCCEs of the EPDCCH resources are numbered separately, the user equipment can determine the numbering $N_{aPUCCH}^{(1)}$ of the extended PUCCH resource for the ACK/NACK, corresponding to the user equipment through Equation 1 according to the received numbering of the eCCEs (for example, the numbering of the first eCCE occupied by the user equipment).

Then in the step S17, the user equipment transmits the ACK/NACK to the base station over the extended PUCCH resource corresponding to the determined numbering of the extended PUCCH resource for the ACK/NACK according to the information associated with the numbering of the extended PUCCH resources. Specifically, in the step S14, the user equipment has acquired the correspondence between the extended PUCCH resources and the numbering of the extended PUCCH resources, so in the step S17, the user equipment can determine the extended PUCCH resource for the ACK/NACK, corresponding to the user equipment according to $n_{aPUCCH}^{(1)}$ determined in the step S16. Next the user equipment transmits the ACK/NACK to the base station over the resource.

In the step S18, according to numbering of eCCEs corresponding to a receiving user equipment and based upon the linkage, the base station determines extended PUCCH resource for the ACK/NACK for the user equipment, and receives the ACK/NACK from the user equipment over the determined resource. Specifically, the base station can identify which user equipment transmits the ACK/NACK and thus locate the corresponding PUCCH resource using the numbering of the eCCEs corresponding to the user equipment, i.e., $n_{global\_eCCE}$, and the linkage, for example, Equation 1, and receive the ACK/NACK from the user equipment over the resource.

Those skilled in the art shall appreciate that some of the steps in this embodiment may not necessarily be performed in a specific sequential order but can be performed concurrently or in a reversed order, for example, the steps S11 and S12.

Figure 3:
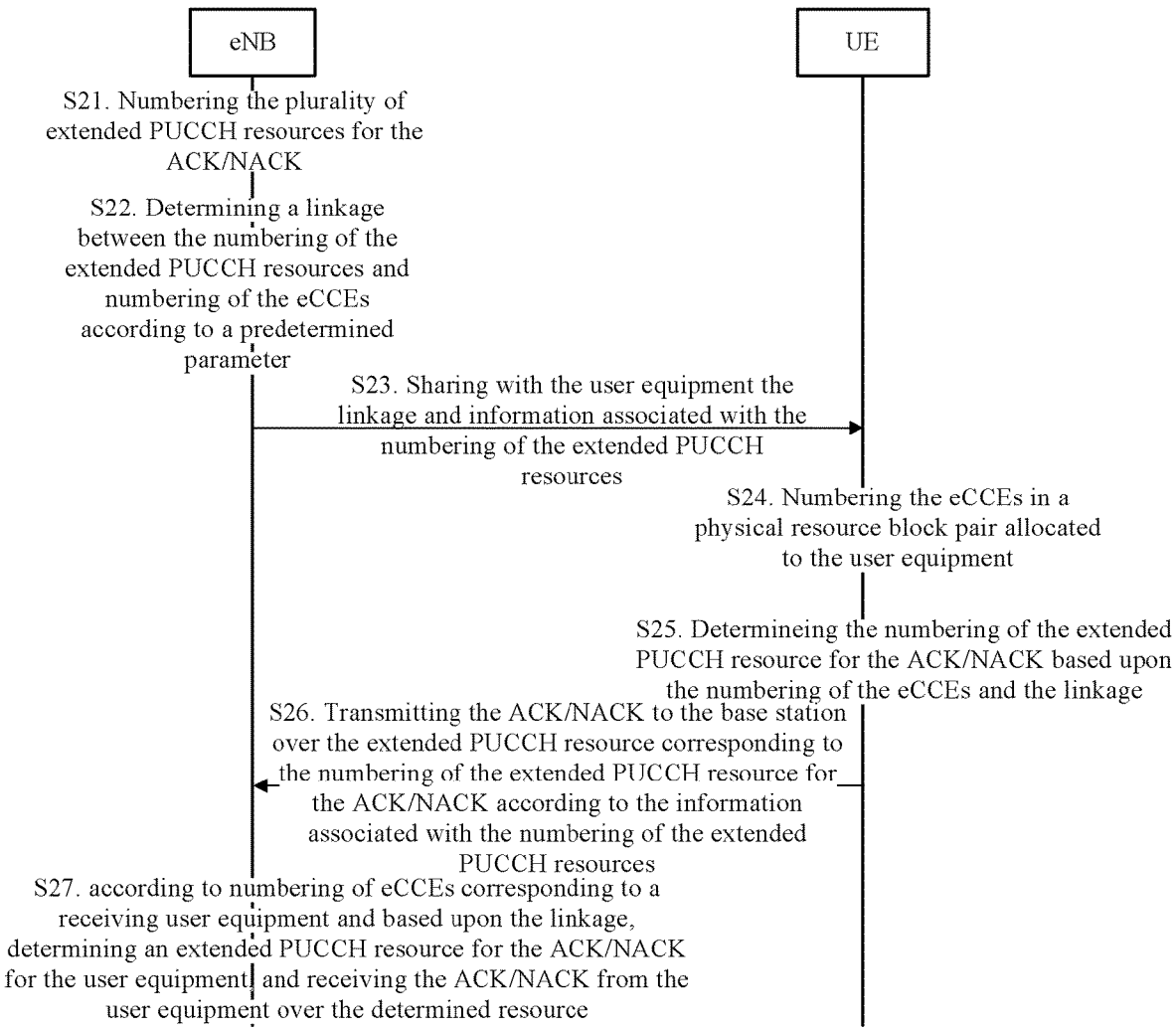
FIG. 3 illustrates a flow chart of a system method of linking extended PUCCH resources for ACK/NACK implicitly to eCCEs used by EPDCCH according to another embodiment of the invention.

FIG. 3 illustrates a flow chart of a system method of linking extended PUCCH resources for ACK/NACK implicitly to eCCEs used by EPDCCH according to another embodiment of the invention.

In this embodiment, the extended PUCCH resources for the ACK/NACK are indexed by numbering the eCCEs in a physical resource block allocated to a user equipment, that is, the eCCEs are numbered locally at the user equipment side.

As illustrated, in the step S21, the base station numbers the plurality of extended PUCCH resources for the ACK/NACK, where each of the plurality of extended PUCCH resources corresponds to one user equipment.

In the step S22, the base station determines a linkage between the numbering of the extended PUCCH resources and numbering of the eCCEs according to predetermined parameters. Preferably, the predetermined parameters can include the sequence number of the physical resource block pair including the eCCE with the lowest numbering of the EPDCCH, corresponding to the user equipment, the total number of DM-RS configurations applied on the eCCE, the sequence number of the DM-RS configuration of the user equipment, etc., in order to avoid conflicting numbering of extended PUCCHs determined by respective user equipments.

The linkage can be determined, for example, through the equation of:

$$n_{aPUCCH}^{(1)} = I_{PRB} \times N_{eCCE} + n_{localized\_eCCE} \times N_{DMRS\_config} + I_{DMRS} + N_{aPUCCH}^{(1)}$$ Eq. 2

In the equation, $n_{aPUCCH}^{(1)}$ represents the numbering of the extended PUCCH resources, $I_{pRB}$ represents the sequence number of the physical resource block pair including the eCCE with the lowest numbering of the EPDCCH, $N_{eCCE}$ represents the total number of eCCEs in the physical resource block pair and is determined, for example, by the number of resource elements available in the physical resource block pair for the EPDCCH. In the case that the eCCEs are numbered locally, $n_{localized\_eCCE}$ represents the lowest numbering of the eCCEs corresponding to the user equipment occupied by the EPDCCH for downlink scheduling data, that is, the numbering of the first eCCE occupied by the user equipment. $N_{aPUCCH}^{(1)}$ represents a boundary index for the extended PUCCH resources and, for example, can be set at a higher layer to reflect an offset between legacy PUCCH resources and the extended PUCCH resources, for details of which, reference can be made to the document "PUCCH resource mapping with EPDCCH" by Alcatel-Lucent Shanghai Bell. $N_{DMRS\_config}$ represents the total number of DM-RS configurations applied on the eCCE, and $I_{DMRS}$ represents the sequence number of the DM-RS configuration of the user equipment. $N_{DMRS\_config}$ and $I_{DMRS}$ are included in DM-RS configuration information. In EPDCCH MU-MIMO transmission, respective user equipments can be identified by DM-RS configurations of antenna ports or by different sequences of scrambling codes over the same antenna port or by the combination thereof, so conflicting numbering of extended PUCCHs determined by the respective user equipments can be avoided effectively with the foregoing parameters. In this way, the extended PUCCH resource for the ACK/NACK can be distinguished and indexed by the sequence number of the physical resource block pair, the numbering of the eCCEs (i.e., the local numbering of the eCCEs at the respective user equipments) and the DM-RS configuration information.

Those skilled in the art shall appreciate that the foregoing linkage is merely illustrative and the parameters in Equation 2 can be configured dependent upon a practical condition, e.g., the number of user equipments, for example, the number of $N_{DMRS\_config}$ is 2 when there are 2 user equipments accessing the same time and frequency resource.

In an alternative embodiment, the following linkage can be utilized:

$$n_{aPUCCH}^{(1)} = I_{PRB} + n_{localized\_eCCE} + I_{DMRS} + N_{aPUCCH}^{(1)}$$ Eq. 3

The respective parameters in Equation 3 are the same as the corresponding respective parameters in Equation 2. Although an application of the linkage represented in Equation 3 may give rise to some confliction, that is, possible conflicting numbering of extended PUCCHs determined by the respective user equipments, Equation 3 can save the PUCCH resources relatively, and the base station can further impose specific restriction during scheduling dependent upon a practical condition to thereby assist flexibly in avoiding confliction. For example, when there is conflicting numbering of PUCCH resources occurring between eCCE0 of the user equipment 1 and eCCE1 of the user equipment 2, the base station can have, for example, the user equipment 2 access eCCE0 to avoid the confliction.

It shall be noted that the linkages indicated in Equation 2 and Equation 3 are merely illustrative and can also be selected dependent upon a practical condition and communication requirement. Those skilled in the art shall also appreciate that other parameters can be selected or some of the parameters in the foregoing linkages can be omitted to derive similar linkages in some implementation variants. In some other embodiments, for example, $n_{localized\_eCCE}$ can represent the numbering of the last eCCE occupied by the user equipment instead of the numbering of the first eCCE occupied by the user equipment.

In the step S23, the base station shares with the user equipment the linkage and information associated with the numbering of the extended PUCCH resources. Preferably, this process can be performed, for example, as per predefinition to thereby avoid the need for the base station to transmit additional signaling to the user equipment after performing the foregoing process. Furthermore, the information associated with the numbering of the extended PUCCH resources can include, for example, a correspondence between the extended PUCCH resources and the numbering of the extended PUCCH resources.

In the step S24, the user equipment numbers the eCCEs in a physical resource block pair allocated to the user equipment, that is, the user equipment numbers the eCCEs locally.

Figure 4:
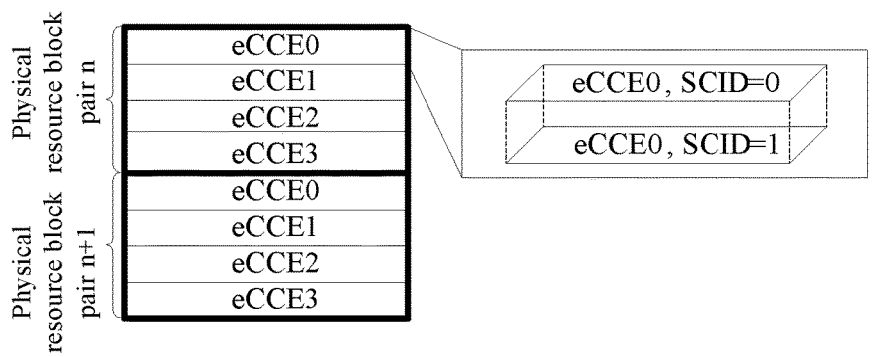
FIG. 4 illustrates a schematic diagram of eCCEs numbered by the user equipment in a physical resource block pair allocated thereto.

Specifically, as illustrated at the left of FIG. 4, a physical resource block pair n and a physical resource block pair n+1 correspond respectively to physical resource block pairs allocated to the user equipment. In this embodiment, there are 4 eCCEs in each physical resource block pair, that is, the number $N_{eCCE}$ is 4, and eCCE0, eCCE1, eCCE2 and eCCE3 are local numbers of the eCCEs in the respective physical resource block pairs.

In the step S25, the user equipment determines the numbering of the extended PUCCH resource for the ACK/NACK based upon the numbering of the eCCEs and the linkage.

Specifically, the user equipment can acquire the sequence number of the physical resource block pair allocated thereto including the eCCE with the lowest number of the EPDCCH or can acquire the DM-RS configuration information. Furthermore the user equipment can also know which eCCEs are accessed by itself and take the lowest number of the occupied eCCEs as $n_{localized\_eCCE}$.

Furthermore when both the user equipment 1 and the user equipment 2 use the same eCCE in the same physical resource block pair (e.g., eCCE0 in FIG. 4), that is, time and frequency resources of the user equipment 1 and the user equipment 2 overlap, then this problem can be addressed through space multiplexing. For example, in the case of two user equipments as illustrated in FIG. 4, the number of $N_{DMRS\_config}$ is set to 2, and $I_{DMRS}$ corresponding to the user equipment 1 may be 0 (i.e., Scrambling Code Identifier (SCID)=0) while $I_{DMRS}$ corresponding to the user equipment 2 may be 1 (i.e., SCID=1). This means that confliction between numbering of ePUCCHs determined by the user equipment 1 and the user equipment 2 can be avoided by utilizing the DM-RS configuration information, for example, by using different sequences of scrambling codes over the same antenna port.

In summary the user equipment can determine all the parameters in the linkage indicated in Equation 2 or Equation 3 and thus determine the numbering $n_{aPUCCH}^{(1)}$ of the PUCCH.

Then in the step S26, the user equipment transmits the ACK/NACK to the base station over the extended PUCCH resource corresponding to the determined numbering of the extended PUCCH resources for the ACK/NACK according to the information associated with the numbering of the extended PUCCH resources. Specifically, in the step S234, the user equipment has acquired the correspondence between the extended PUCCH resources and the numbering of the extended PUCCH resources, so in the step S26, the user equipment can determine the extended PUCCH resource for the ACK/NACK corresponding to the user equipment, according to $N_{aPUCCH}^{(1)}$ determined in the step S25. Next the user equipment transmits the ACK/NACK to the base station over the resource.

In the step S27, according to numbering of eCCEs corresponding to a receiving user equipment and based upon the linkage, the base station determines extended PUCCH resource for the ACK/NACK for the user equipment, and receives the ACK/NACK from the user equipment over the determined resource. Specifically, the base station can identify which user equipment transmits the ACK/NACK and can sum up the local numbering of the eCCEs of the respective user equipments (that is, although the respective user equipment numbers the corresponding eCCEs respectively, the base station can finally acquire information summing up the numbering of all the eCCEs, and as mentioned above, the eCCEs are numbered for the user equipments, that is, the eCCEs corresponding to the user equipments can be determined based on the user equipment), so that the base station can determine the numbering of the eCCEs corresponding to the user equipment and then locate the corresponding PUCCH resource through the linkage, for example, Equation 2 or Equation 3, and receive the ACK/NACK from the user equipment over the resource.

Those skilled in the art shall appreciate that some of the steps in this embodiment may not necessarily be performed in a specific sequential order but can be performed concurrently or in a reversed order, for example, the steps S23 and S24.

Those skilled in the art shall appreciate that the foregoing embodiments are merely illustrative but not limiting. Different technical features present in different embodiments can be combined to advantage. Those skilled in the art shall appreciate and implement other variants of the disclosed embodiments upon review of the drawings, the description and the claims. In the claims, the term "comprising" shall not preclude another device(s) or step(s); the indefinite article "a" or "an" shall not preclude plural; and the terms "first", "second", etc., are intended to designate a name but not to suggest any specific order. Any reference numerals shall not be construed as limiting the claimed scope. A function(s) of a plurality of parts present in the claims can be performed by a separate part. The presence of some technical features in different dependent claims shall not mean that these technical features can not be combined to advantage.

The invention claimed is:

1. A method, in a base station of a communication system, of linking physical uplink control channel resources for acknowledgement/not acknowledgement to enhances control channel element used by one or more enhanced physical downlink control channel, one or more enhanced physical downlink control channel uses the enhanced control channel element for transmission, the method comprises:

numbering a plurality of physical uplink control channel resources for acknowledgement/not acknowledgement, without confliction among user equipments served by the base station wherein each of the plurality of physical uplink control channel resources corresponds to one user equipment;

numbering the enhanced control channel element used by the one or more enhanced physical downlink control channel, wherein the numbering of the enhanced control channel element corresponds to an offset in physical uplink control channel resources;

determining a linkage between the numbering of the physical uplink control channel resources and the numbering of the enhanced control channel element;

sharing with one or more of the user equipments the linkage and/or information associated with the numbering of the physical uplink control channel resources; and transmitting number information associated with the enhanced control channel element to the one or more user equipments, wherein the number information comprises the offset.

2. The method according to claim 1, wherein the determining further comprises:

determining the linkage between the numbering of the physical uplink control channel resources and the numbering of the enhanced control channel element according to a boundary index.

3. The method according to claim 1, wherein the transmitting further comprises:
the number information includes an offset factor when the enhanced control channel element of the enhanced physical downlink control channel resources are numbered subsequent to numbering of control channel element of legacy physical downlink control channel resources.

4. The method according to claim 1, wherein the transmitting further comprises:
the number information includes the numbering of the enhanced control channel element when the enhanced control channel element of the enhanced physical downlink control channel resources are numbered separately.

5. The method according to claim 1, wherein the method further comprises:
according to numbering of enhanced control channel element corresponding to a receiving user equipment and based upon the linkage, determining physical uplink control channel resource for the acknowledgement/not acknowledgement for the user equipment, and receiving the acknowledgement/not acknowledgement from the user equipment over the determined resource.

6. A method, in a user equipment of a communication system, of linking physical uplink control channel resources for acknowledgement/not acknowledgement to enhanced control channel element used by one or more enhanced physical downlink control channel, wherein the user equipment is served by a base station, one or more enhanced physical downlink control channel use the enhanced control channel element for transmission, the method comprises:
sharing, with the base station, information associated with numbering of the physical uplink control channel resources and a linkage between the numbering of the enhanced control channel element resources and numbering of the enhanced control channel element, wherein the physical uplink control channel resources are numbered without confliction among user equipments served by the base station, and the numbering of the enhanced control channel element corresponds to an offset in physical uplink control channel resources;
receiving number information associated with the enhanced control channel from the base station, wherein the number information comprises the offset; and
determining the numbering of the physical uplink control channel resource for the acknowledgement/not acknowledgement based upon the number information and the linkage.

7. The method according to claim 6, wherein the linkage is a linkage between the numbering of the physical uplink control channel resources and the numbering of the enhanced channel element according to a boundary index.

8. The method according to claim 6, wherein the number information includes an offset factor when the enhanced control channel element of the enhanced physical downlink control channel resources are numbered subsequent to numbering of control channel element of legacy physical downlink control channel resources.

9. The method according to claim 6, wherein the number information includes the numbering of the enhanced control channel element when the enhanced control channel element of the enhanced physical downlink control channel resources are numbered separately.

10. The method according to claim 6, wherein the method further comprises:
transmitting the acknowledgement/not acknowledgement to the base station over the physical uplink control channel resource corresponding to the determined numbering of the physical uplink control channel resource for the acknowledgement/not acknowledgement, according to the information associated with the numbering of the physical uplink control channel resources.

11. A method, in a base station of a communication system, of linking physical uplink control channel resources for acknowledgement/not acknowledgement to enhanced control channel element used by one or more enhanced physical downlink control channel, the one or more enhanced physical downlink control channel uses the enhanced control channel element for transmission, the method comprises:
numbering a plurality of physical uplink control channel resources for acknowledgement/not acknowledgement without confliction among user equipments served by the base station, wherein each of the plurality of physical uplink control channel resources corresponds to one user equipment;
determining a linkage between the numbering of the physical uplink control channel resources and numbering of the enhanced control channel element according to a predetermined parameter, wherein the numbering of the enhanced control channel element corresponds to an offset in physical uplink control channel resources; and
sharing with the user equipment the linkage, the offset and information associated with the numbering of the physical uplink control channel resources.

12. The method according to claim 11, wherein the method further comprises:
according to numbering of enhanced control channel element corresponding to a receiving user equipment and based upon the linkage, determining physical uplink control channel resource for the acknowledgement/not acknowledgement for the user equipment, and receiving the acknowledgement/not acknowledgement from the user equipment over the determined resource.

13. The method according to claim 11, wherein the predetermined parameter includes one of a sequence number of a physical resource block pair occupied by the user equipment, the total number of enhanced control channel element in the physical resource block pair, demodulation-reference signal configuration information and a boundary index.

14. A method, in a user equipment of a communication system, of linking physical uplink control channel resources for acknowledgement/not acknowledgement to enhanced control channel element used by one or more enhanced physical downlink control channel, wherein the user equipment is served by a base station, the one or more enhanced physical uplink control channel use the enhanced control channel element for transmission, the method comprises:
sharing, with the base station, information associated with numbering of the physical uplink control channel resources and a linkage between the numbering of the physical uplink control channel resources and numbering of the enhanced control channel element, wherein the linkage is determined according to a predetermined parameter, and the physical uplink control channel resources are numbered without confliction among user equipments served by the base station;

numbering enhanced control channel element in a physical resource block pair allocated to the user equipment, wherein the numbering of the enhanced control channel element corresponds to an offset in physical uplink control channel resources;

determining the numbering of the physical uplink control channel resource for the acknowledgement/not acknowledgement based upon the number information of the enhanced control channel element and the linkage; and transmitting the acknowledgement/not acknowledgement to the base station over the physical uplink control channel resource corresponding to the determined numbering of the physical uplink control channel resources for the acknowledgement/not acknowledgement, according to the information associated with the numbering of the physical uplink control channel resources.

15. The method according to claim 14, wherein the predetermined parameter includes one of a sequence number of a physical resource block pair occupied by the user equipment, the total number of enhanced control channel element in the physical resource block pair, demodulation-reference signal configuration information and a boundary index.

* * * * *